United States Patent
Hastilow et al.

(10) Patent No.: US 7,030,332 B2
(45) Date of Patent: Apr. 18, 2006

(54) MONITORING ELECTRODE CONDITION IN AN ELECTRO-DISCHARGE MACHINE

(75) Inventors: Neil K Hastilow, Bristol (GB); Paul N Bennett, Cardiff (GB)

(73) Assignee: Rolls-Royce, PLC, London (GB)

( * ) Notice: Subject to any disclaimer, the term of this patent is extended or adjusted under 35 U.S.C. 154(b) by 0 days.

(21) Appl. No.: 11/002,483

(22) Filed: Dec. 3, 2004

(65) Prior Publication Data

US 2005/0127042 A1    Jun. 16, 2005

(30) Foreign Application Priority Data

Dec. 11, 2003  (GB) .................................. 0328685

(51) Int. Cl.
*B23H 1/04* (2006.01)
*B23H 7/26* (2006.01)

(52) U.S. Cl. ............................ 219/69.17; 219/69.15; 219/69.16; 219/69.2

(58) Field of Classification Search ............ 219/69.16, 219/69.2, 69.17, 69.15
See application file for complete search history.

(56) References Cited

U.S. PATENT DOCUMENTS

| 3,601,572 A | * | 8/1971 | Check et al. | ............... 219/69.2 |
| 4,191,878 A | * | 3/1980 | Check et al. | ............ 219/69.15 |
| 4,510,364 A |   | 4/1985 | Ito |   |
| 6,225,589 B1 | * | 5/2001 | Bartok | .................... 219/69.15 |

FOREIGN PATENT DOCUMENTS

| EP | 0 176 603 A1 |   | 4/1986 |   |
| JP | 61-14816 A | * | 1/1986 | .............. 219/69.16 |

* cited by examiner

*Primary Examiner*—Geoffrey S. Evans
(74) *Attorney, Agent, or Firm*—Oliff & Berridge, PLC

(57) ABSTRACT

A method and device for monitoring the condition of an electrode in an electro-discharge machine are disclosed. The device includes an electrode detector operable to produce a position signal indicative of the position of an end region of the electrode in the nose-guide, and a signal processing unit connected to receive a position signal from the electrode detector and operable to determine from the position signal when retraction of the electrode into the nose-guide has occurred. The method monitors the position of the end region of the electrode and determines when retraction of the electrode has occurred.

20 Claims, 2 Drawing Sheets

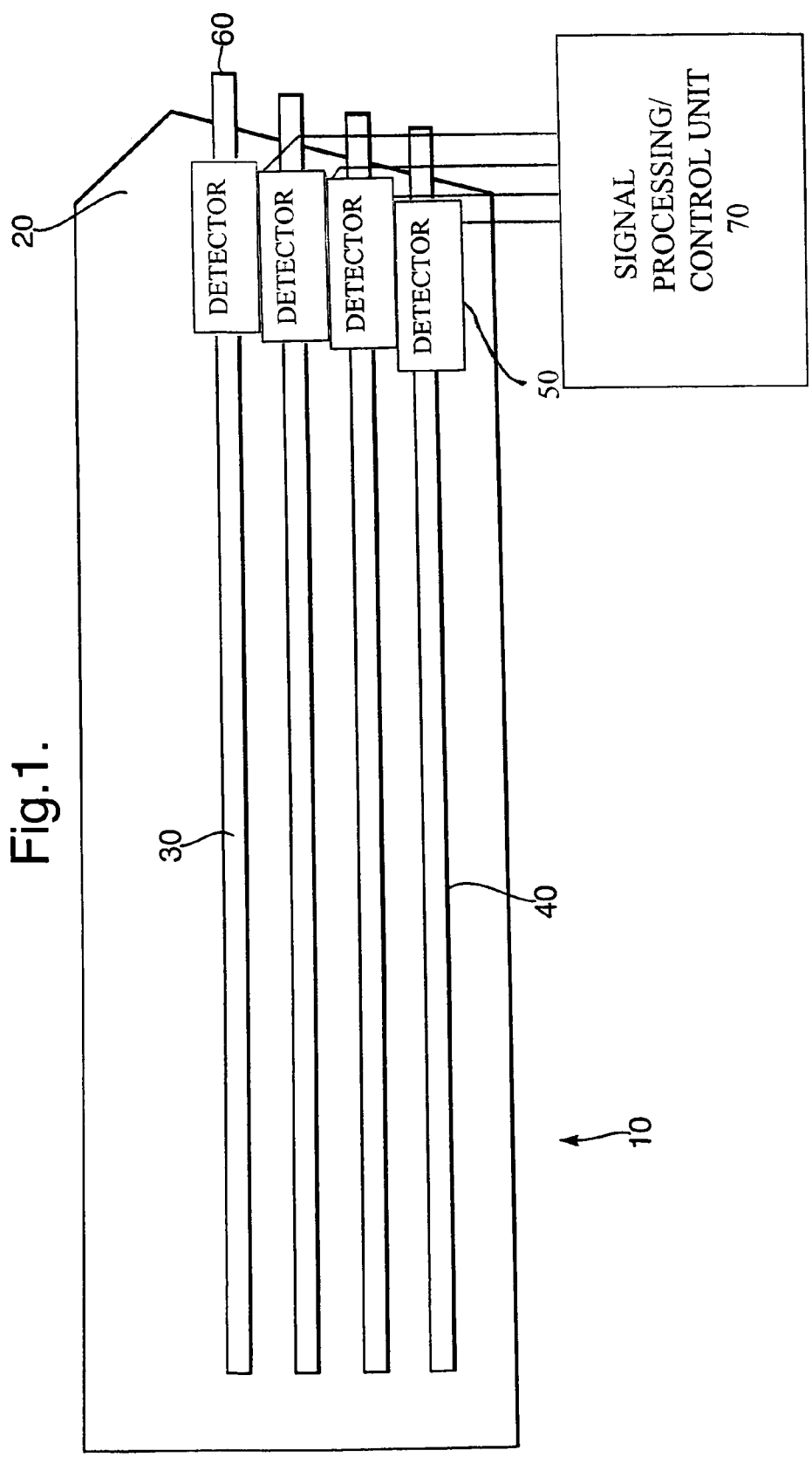

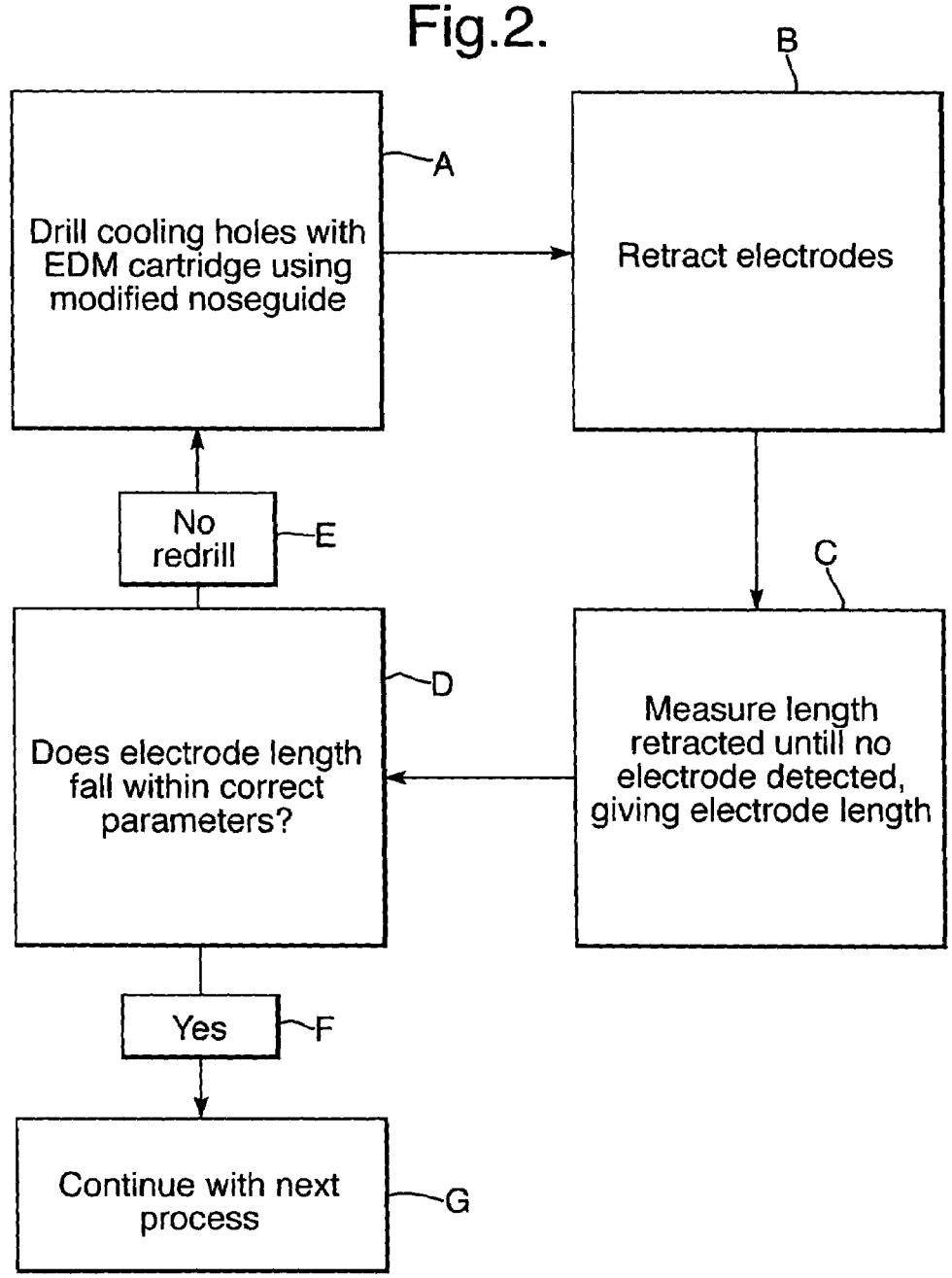

MONITORING ELECTRODE CONDITION IN AN ELECTRO-DISCHARGE MACHINE

This invention relates to a device and method for monitoring the condition of an electrode in an electro-discharge machine.

Electro-Discharge Machining (EDM), often referred to as "spark-eroding" or "sink erosion" is a process of controlled electrical erosion or vaporisation of electrically conductive material, such as metal materials, through a series of repetitive sparks between electrodes, that is, between a workpiece and a tool. This type of machining removes metal from a workpiece by converting the kinetic energy of electric sparks into heat as the sparks strike the workpiece, such that the controlled sparks gradually erode a desired shape in the workpiece. The workpiece forms the cathode and the tool, otherwise referred to as the electrode, forms the anode.

Electrodes are made from conductive materials such as graphite, copper, brass or copper tungsten. A flow of dielectric fluid, such as a hydrocarbon oil, is pumped into the gap between the electrode and the workpiece to allow a path for the electrical discharge and to flush away debris from the arcing. A pulsating dc power supply is connected between the two. The discharges travel through, and ionise, the dielectric fluid, and sparks occur where the two surfaces are closest. The region in which the spark occurs is heated to such high temperatures that a small speck of the work surface is melted and removed from the workpiece, and is subsequently swept away by the dielectric flow. This part of the workpiece is now below the average level of the workpiece surface so the next highest areas of the workpiece are removed next. These discharges occur hundreds or thousands of times per second so that gradually all the area on the workpiece conforming to the electrode is eroded.

EDM can be used to machine virtually any material, as long as it is a relatively good conductor of electricity. These include metals, alloys and carbides which are too hard or delicate to machine by conventional methods. The melting point, hardness or brittleness of the material does not affect the process and the tool does not have to be harder than the workpiece, as no physical contact occurs between the two. Hence EDM is capable of repeatedly machining complex shapes in already hardened and stabilised materials. In addition, as no mechanical force is applied to the workpiece, very delicate and fragile components can be produced without distortion of the workpiece. Furthermore, good surface finishes are also readily attainable and EDM is capable of producing components with extremely fine finishes to precision tolerances measured in 10 thousands of an inch.

For these reasons and the other advantages previously mentioned, EDM is used extensively in to machine components for use in aero engineering. For example, EDM is used to machine cooling holes in super alloy components of gas turbine airfoils in circumstances where accessibility or hole shape complexity precludes the use of laser drilling. Cooling holes are formed in the airfoil wall sections of nozzle guide vanes to enable cooling air fed, for example, from the engine compressor to pass from the hollow core of the nozzle guide vanes to form a thin film of cooling air over the airfoil surface, thereby protecting the airfoil from the effects of high temperature combustion gasses.

EDM machines typically use a single or multi-electrode "nose-guide" to direct the electrodes at the correct point relative to the workpiece, such that the this nose guide stands off from the components by about 2 mm. The electrodes are then pushed out of the nose guide towards the surface of the workpiece to be machined. Initially, the electrodes reverse machine or redress on the surface of the workpiece so that all the electrodes are sensed by the EDM machine to be touching the surface. The EDM machine then machines the hole(s), the cross-section of the hole(s) being determined by the geometry of the electrode(s), by creating controlled sparks between the electrode(s) and the workpiece.

One drawback to the machining process is that since the electrodes are required to machine different thickness of component material, the electrodes wear at different rates. Occasionally one or more electrodes will fail to break out the other side of the component being machined, due either to the electrode breaking or becoming welded to the component, thereby resulting in incomplete machining of a hole through the material.

Currently, damage to an electrode and therefore incomplete machining is only detected if manual inspection of the machined component reveals an incompletely machined hole. By this time in the process, several components may have been incompletely machined. This is clearly undesirable as the incompletely machined components will need to be re-entered into the EDM process, re-aligned with the EDM cartridge and re-machined. This adds to both the time and cost of the production process.

Typically, when using EDM processes, it is necessary to estimate the number of components an electrode or a set of electrodes can machine before the electrodes need replacing. The requirement to err on the side of caution, in order to minimise the risks of incorrectly machined components due to electrode wear and/or damage, leads to continuous wastage of extremely expensive electrodes.

There is a requirement therefore for a method of monitoring the condition of an electrode during an EDM process to determine if any damage has occurred to the electrode and therefore if any action is required to repair or replace the electrode. In particular, there is a need to identify any damaged electrodes at the first sign of incorrect machining to avoid the continued production of several non-conformal components. If damaged electrodes can be identified at an early stage, the EDM process may be carried out without the need to replace an electrode until damage has occurred, thereby saving time and also reducing machining costs.

According to a first aspect of the invention, there is provided a device for monitoring the condition of an electrode in an electro-discharge machine, the device comprising an electrode detector operable to produce a position signal indicative of the position of an end region of the electrode with respect to the nose-guide, and a signal processing unit connected to receive a position signal from the electrode detector and operable to determine from the position signal when or whether retraction of the electrode into the nose-guide has occurred.

In this way, it is possible to detect if an electrode has been damaged as either no retraction of the electrode will be detected, indicative of an electrode which has become welded to the component, or else retraction of the end region of the electrode into the nose-guide will occur sooner than expected, indicating that the electrode has broken.

A device according to the present invention allows the condition of an electrode to be determined after completion of each machining operation, thereby avoiding the situation where several components have been incorrectly machined due to damaged electrodes, in contrast to the current prior art situation where the presence of damaged electrodes only becomes apparent when the components are manually inspected after completion of the machining process and removal from the EDM line.

Preferably, the electrode detector is operable to detect retraction of the electrode to a predetermined retracted position within the nose-guide. The predetermined retracted position may be any suitable position within the nose-guide passed which the electrode moves during retraction. For example, the predetermined retracted position may be close to the surface of the nose-guide to minimise the amount of retraction of the electrode necessary to monitor the condition of the electrode. Alternatively, the predetermined retracted position may be located at any other suitable location, for example, further within the nose-guide.

The signal processing unit may be operable to determine the amount of time taken for the electrode to move from an operating position where machining of a hole in a component has been completed to the predetermined retracted position, the time taken being indicative of the condition of the electrode.

If the time taken for the electrode to move from an operating position to the predetermined retracted position is equal to a predetermined time corresponding to a desired machining depth, the electrode is in an undamaged condition.

Alternatively, if no retraction of the electrode is detected by the electrode detector, it is indicative that the electrode is welded to the component.

A further alternative is that retraction of the electrode is detected by the electrode detector and the time taken for the electrode to move from an operating position to the predetermined retracted position is not equal to a predetermined time corresponding to a desired machine depth. This in indicative of a damaged electrode. If the time taken is less than a predetermined time corresponding to a desired machining depth, this is indicative of a shortened electrode, that is, damage has occurred to the electrode which has broken.

Preferably, if the time taken for the electrode to move from an operating position to the predetermined retracted position is not equal to a predetermined time corresponding to a desired machining depth, the signal processor is operable to output a signal indicative of electrode damage. This output signal, indicative of electrode damage, alerts the operator of the device to the damaged condition of an electrode in the electro-discharge machine, so that appropriate repair and/or replacement operations may be carried out.

Alternatively, the signal processing unit may be operable to detect the length of electrode retracted that passes the predetermined retraction position on retraction of the electrode from an operating position until no electrode is detected by the electrode detector.

If the detected length of the electrode is less than the expected length of a corresponding undamaged electrode, the electrode being retracted is likely to be damaged. If the detected length of the electrode is larger than expected, or even infinite i.e. no retraction detected, the electrode is likely to have become welded to the component being machined. Alternatively, a detected length equal to an expected length is indicative of an undamaged electrode.

Preferably, if the detected length is not equal to the expected length, the signal processor is operable to output a signal indicative of electrode damage to alert the operator of the damaged condition of an electrode in the electro-discharge machine, so that appropriate repair and/or replacement operations may be carried out.

In a device according to the present invention, the electrode detector may take many forms, but is preferably a switch such as a sprung switch or alternatively may be a voltage detector. However, it will be appreciated that any other suitable electrode detector may be used.

The nose-guide of the device may be adapted to receive more than one electrode, such that the electro-discharge machine is provided, for example, with an array of electrodes, by which means an array of corresponding holes may be machined by the electro-discharge machine if desired, rather than machining a series of single holes thereby involving separate alignment of the electrode prior to machining.

The signal processor may be operable to output a signal to the electro-discharge machine to return the electrode or electrodes to an operating position to re-machine the component when a damaged electrode has been detected. In this way, any hole corresponding to a damaged electrode can be re-machined without the need to realign the electro-discharge machine relative to the component to be machined.

The device may further comprise a re-feed template to redress the damaged electrode or electrodes before the electrode or electrodes are returned to an operating position to re-machine the component. In this manner, rather than pushing a damaged electrode further into the component in order to re-machine the hole in the component, the damaged electrode is replaced with an undamaged electrode and the hole re-machined.

A further aspect of the present invention provides a method of monitoring the condition of an electrode in the nose-guide of an electro-discharge machine comprising monitoring the position of an end region of the electrode in the nose-guide and determining when retraction of the electrode from an operating position to a predetermined retracted position within the nose-guide has occurred. By this method, it is possible to determine if the electrode is of an expected undamaged length as the time taken for the electrode to retract from an operating position to a predetermined retracted position will be known for an undamaged electrode of known length. A comparison of the actual time taken and the expected time taken for an undamaged electrode to retract from an operating position to a predetermined retracted position provides an indication of the condition of the electrode being monitored.

By comparing the time taken for the electrode to retract to the predetermined retracted position with a predetermined time corresponding to a desired machining depth, the electrode may be determined to be in an undamaged position if the two times are equal. Alternatively, if the two times are unequal, this is indicative of a damaged electrode.

Alternatively, as mentioned previously, the length of electrode passing the predetermined retracted position may be determined and compared with the expected length of an undamaged electrode, to determine the condition of the electrode being monitored.

The method may further comprise re-dressing of the damaged electrode such that the electro-discharge machine may be immediately reused to re-machine the hole corresponding to the damaged electrode.

Preferably, the method is automated. This minimises the down-time of the machining process and obviates the need for human intervention in order to replace any damaged electrodes, thus also minimising the opportunity for human-error to be introduced into the method.

An embodiment of the present invention will now be more particularly described, by way of example only, and with reference to the accompanying drawings, in which:

FIG. 1 shows a cross-section of an electro-discharge machine incorporating an embodiment of a device according to the present invention; and FIG. 2 is a flow chart of the mode of operation of the device of FIG. 1.

FIG. 1 shows an electro-discharge machine 10 with a nose guide 20. Electrodes 30 are received within passages 40 formed in the nose-guide. Each electrode 30 is provided with a electrode detector 50 in communication with the passage 40 within the nose-guide 20.

In use, electrodes 30 are received within the passages 40 in the nose-guide 20 of the electro-discharge machine 10. In use, the electrode detectors detect the presence of an electrode at a predetermined retracted position within the passage 40 of the nose-guide 20. In use, a proportion of an electrode 30 protrudes beyond the leading edge of the nose guide 20, as shown in FIG. 1. The distance between the leading edge of the nose guide 20 and the exposed end 60 of the electrodes 30 being selected dependent on the depth of the hole to be machined by the electro-discharge machine 10 in a component to be machined. The distance therefore between an electrode detector 50 and the end 60 of a corresponding undamaged electrode 30 to which the electrode detector 50 is connected is known and/or the expected time for the end 60 of the electrode 30 to retract beyond the position of the electrode detector 50 within the nose-guide 20 of the electro-discharge machine 10 with the known. Therefore, in operation, the electrodes 30 are retracted from an operating position, in which the ends 60 of the electrodes 30 protrude a known amount beyond the leading edge of the nose-guide 20, to a predetermined retracted position within the nose-guide. The electrode detector 50 is operable to detect the presence of the electrode at the predetermined retracted position as it is retracted from the operating position until such time as the electrode 30 has passed beyond the predetermined retracted position within the passage 40 of the nose-guide 20. Once the electrode 30 passes the predetermined retracted position, the electrode 30 is no longer detected by the electrode detector 50 which is operable to supply a signal to a signal processing unit 70 indicative of the retraction of the electrode 30 passed the predetermined retracted position within the passage 40 within the nose-guide 20.

On receipt of a signal from the electrode detector 50, that the electrode 30 has passed the predetermined retracted position within the passage 40 within the nose-guide 20, the signal processing unit 70 is operable to determine if the amount of time taken by the electrode to retract from the operating position to the predetermined retracted position is equal or unequal to the expected time of retraction of an undamaged electrode from an operating to a predetermined retracted position.

If the time taken is equal, it is indicative that the electrode 30 is undamaged, and no action is necessary to replace the electrode.

If the electrode detector 50 does not detect the retraction of the electrode 30 to a predetermined retracted position within the passage 40 of the nose-guide 20, this is indicative of the electrode being welded to the component being machined. If this occurs, the electrode can be removed from the component and a new or repaired electrode provided in the nose-guide 20 of the electro-discharge machine 10.

Alternatively, if the time taken for the end 60 of the electrode 30 to retract to the predetermined retracted position is less than the expected time corresponding to a desired machining depth, it is likely that the electrode is broken. If this is the case, a signal will be provided to the signal processing unit 70 by the electrode detector 50 when the end 60 of the electrode passes the predetermined retracted position. The signal processing unit on processing the signal and determining that the time taken for the electrode 30 to retract is less than the predetermined time corresponding to a desired machining depth, will output a signal indicative of electrode damage to alert an operator of the device that the electrode is damaged, so that appropriate action to repair or replace the damaged electrode may be taken.

The electrode detector 50 in FIG. 1 takes the form of a switch, such as a sprung switch or the like, although any other suitable switch or detector, such as a voltage detector may be used as an alternative.

The device may also include a re-feed template to re-dress the damaged electrode or electrodes before returning the electrodes to an operating position so that the component may be re-machined to ensure that the hole has been formed correctly and to the correct depth.

An EDM process including the steps of monitoring the condition of the electrodes of the electro-discharge machine, will now be described with reference to FIG. 1 and the flow chart of FIG. 2.

In Step A, a conventional EDM cartridge is accurately aligned with a work piece, in this case an airfoil, in which a cooling hole is to be machined, and the hole machined using EDM technology. After machining of the cooling hole, the electrodes 30 will be in an operating position. In Step B, the electrodes 30 are retracted from an operating position back into the nose-guide, and beyond a predetermined retracted position. On detection of retraction of the end 60 of an electrode 30 beyond the predetermined retracted position within the nose-guide 20, the corresponding electrode detector 50 is operable to supply a signal to the control unit 70. In Step C, the control unit 70 calculates the length of electrode retracted from the operating position to the predetermined retracted position until no electrode is detected by the electrode detector 50, thereby providing an electrode length. The control unit 70 then compares the calculated electrode length with a set of correct parameters corresponding to the expected electrode length for an undamaged electrode being used in the EDM process. If the calculated electrode length falls within the correct expected parameters, this is indicative of an undamaged electrode, and the EDM process may continue.

Alternatively, if the calculated electrode length falls outside the correct expected parameters, this is indicative of damage to the electrode and the appropriate action is taken to repair and/or replace the electrode before proceeding back to Step A to re-machine the cooling hole in the work piece. The EDM process then proceeds on to Step B where the process of checking the condition of the electrodes is repeated until at Step D the calculated electrode length falls within correct parameters, indicating no damage to any of the electrodes.

Although aspects of the invention have been described with reference to the embodiment shown in the accompanying drawings, it is to be understood that the invention is not limited to the precise embodiment shown and that various changes and modifications may be effected without further inventive skill and effort.

The invention claimed is:

1. A device for monitoring the condition of an electrode received in a nose-guide of an electro-discharge machine, the device comprising an electrode detector operable to produce a position signal indicative of the position of an end region of the electrode with respect to the nose-guide, and a signal processing unit connected to receive a position signal from the electrode detector and operable to determine from the position signal when or whether retraction of the electrode into the nose-guide has occurred by detecting retraction of the electrode to a predetermined retracted position within the nose-guide.

2. An electro-discharge machine comprising a nose-guide for receiving an electrode therein and a device according to claim 1.

3. A device according to claim 1 wherein the signal processing unit is operable to determine the amount of time taken for the electrode to move from an operating position where machining of a hole in a component has been completed to the predetermined retracted position, the time taken being indicative of the condition of the electrode.

4. A device according to claim 3 wherein the signal processing unit is operable to determine that the electrode is in an undamaged condition when the time taken for the electrode to move from an operating position to the predetermined retracted position equals a predetermined time corresponding to a desired machining depth.

5. A device according to claim 3 wherein the signal processing unit is operable to determine that the electrode is damaged when the time taken for the electrode to move from an operating position to the predetermined retracted position is not equal to a predetermined time corresponding to a desired machining depth.

6. A device according to claim 5 wherein the signal processing unit is operable to output a signal indicative of electrode damage when the time taken for the electrode to move from an operating position to the predetermined retracted position is not equal to a predetermined time corresponding to a desired machining depth, the signal processing unit is operable to output a signal indicative of electrode damage.

7. A device according to claim 5 wherein the signal processing unit is operable to output a signal indicative that the electrode is broken when the time taken for the electrode to move from an operating position for the predetermined retracted position is less than a predetermined time corresponding to a desired machining depth.

8. A device according to claim 7, wherein the signal processing unit is operable to output a signal to the device to return the electrode or electrodes to an operating position to re-machine the component when the time taken for the electrode to move from an operating position to the predetermined retracted position is less than a predetermined time corresponding to a desired machining depth.

9. A device according to claim 1 wherein the electrode detector is a switch.

10. A device according to claim 9 wherein the switch is a sprung switch.

11. A device according to claim 1 wherein the electrode detector is a voltage detector.

12. A device according to claim 1 wherein the nose-guide is adapted to receive a plurality of electrodes.

13. A device according to claim 12 wherein the plurality of electrodes form an array.

14. A device according to claim 13, wherein the device further comprises a re-feed template to re-dress the damaged electrode or electrodes before the electrodes are returned to an operating position to re-machine the component.

15. A device according to claim 1 wherein the signal processing unit is operable to determine that the electrode is broken when no detection of retraction of the electrode is made by the electrode detector.

16. A method of monitoring the condition of an electrode in the nose-guide of an electro-discharge machine comprising monitoring the position of an end region of the electrode in the nose-guide and determining when retraction of the electrode from an operating position to a predetermined retracted position within the nose-guide has occurred.

17. A method according to claim 16 further comprising the step of measuring the time taken for the electrode to retract to the predetermined retracted position.

18. A method according to claim 17 further comprising the step of comparing the time taken for the electrode to retract to the predetermined retracted position with a predetermined time corresponding to a desired machining depth, wherein if the two times are equal, the electrode is in an undamaged condition and if the two times are unequal, the electrode is in a damaged condition.

19. A method according to claim 18 further comprising re-dressing of the damaged electrode.

20. A method according to claim 19 wherein the method is automated.

* * * * *